US007065575B1

(12) United States Patent
Machiraju et al.

(10) Patent No.: US 7,065,575 B1
(45) Date of Patent: Jun. 20, 2006

(54) COOPERATIVE NETWORKING METHOD AND SYSTEM

(75) Inventors: Vijay Machiraju, Mountain View, CA (US); James Thomas Edward McDonnell, Bristol (GB); Peter J. Macer, Bristol (GB); Salil Pradhan, Santa Clara, CA (US); John Deryk Waters, Bath (GB); John Brassil, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 09/715,045

(22) Filed: Nov. 20, 2000

(51) Int. Cl.
G06F 15/173 (2006.01)
G06F 15/167 (2006.01)

(52) U.S. Cl. ............... 709/226; 709/212; 709/214; 709/216

(58) Field of Classification Search ............... 709/216, 709/217, 226, 227, 229, 212, 214
See application file for complete search history.

(56) References Cited

U.S. PATENT DOCUMENTS

| 4,800,488 | A | * | 1/1989 | Agrawal et al. | 709/225 |
|---|---|---|---|---|---|
| 5,719,854 | A | * | 2/1998 | Choudhury et al. | 370/231 |
| 5,995,503 | A | * | 11/1999 | Crawley et al. | 370/351 |
| 6,081,826 | A | * | 6/2000 | Masuoka et al. | 718/100 |
| 6,212,640 | B1 | * | 4/2001 | Abdelnur et al. | 713/201 |
| 6,249,836 | B1 | * | 6/2001 | Downs et al. | 709/226 |
| 6,477,576 | B1 | * | 11/2002 | Angwin et al. | 709/226 |
| 6,532,368 | B1 | * | 3/2003 | Hild et al. | 455/515 |
| 2002/0025798 | A1 | * | 2/2002 | Titmuss et al. | 455/412 |
| 2003/0149794 | A1 | * | 8/2003 | Morris et al. | 709/249 |

* cited by examiner

*Primary Examiner*—Zarni Maung
*Assistant Examiner*—Hassan Phillips

(57) ABSTRACT

A co-operative network includes a first device that advertises resources it has available for sharing and a second device that requests at least part of the available resources of the first device. The devices co-operatively execute a task using the shared resources of the first device and the resources of the second device.

41 Claims, 2 Drawing Sheets

COOPERATIVE NETWORKING METHOD AND SYSTEM

FIELD OF INVENTION

This invention relates to a system and method of co-operative networking.

BACKGROUND ART

In the present specification the term "mobile device" encompasses all mobile transceivers of data, for example but not exclusively personal digital assistants, mobile telephones and laptop computers. The terms "communication network" and "network" encompasses but are not restricted to computer and telephony networks wherein data is passed over the network between entitles connected to the network. "Data" is used to refer to any form of information carried over the network, for example, but not exclusively video, telephone audio or textual information.

Current mobile devices, for example personal digital assistants (PDAs), have limited capabilities in such areas as storage capacity, processing power, power source lifetime and transmission link bandwidth.

One way which at least partially alleviates the problems is to form a wireless network using wide bandwidth short range (WBSR) wireless links such a Bluetooth or IEEE802.11 either via access points or via direct wireless links between mobile devices and allowing users of the mobile devices to manually select resources to be shared.

Current networking protocols allow devices connected to the network to advertise their presence within a network but do not allow the devices to advertise their available resources and develop a co-operative networking scheme involving the sharing of resources between devices within the WBSR network ranges.

It is an object of the present invention to provide a telecommunication method which, at least partly, ameliorates at least one of the above mentioned disadvantages/problems.

It is another object of the present invention to provide a method of improving the performance of a network which, at least partly, ameliorates at least one of the above mentioned disadvantages/problems.

It is another object of the present invention to provide a networking system which, at least partly, ameliorates at least one of the above mentioned disadvantages/problems.

It is a further object of the present invention to provide a networking protocol which, at least partly, ameliorates at least one of the above mentioned disadvantages/problems.

According to one aspect of the present invention there is provided a telecommunication method comprising the steps of:

providing a network including at least two network elements;

broadcasting data over the network by a first network element indicating the resources of the first network element available for sharing within the data;

requesting the use of at least part of the available resources of the first network element by a second network element;

executing of a task by co-operation of the first and second network elements; and releasing the resources of the first network element by the second network element upon completion of the task.

The method may include the step of the first and second network elements negotiating a cost for the resources. The cost may be in the form of a monetary value or central processor time or other resource of the second network element, for example memory, storage or connections.

The method may further include the step of providing the network in the form of a wide band short range (WBSR) wireless network, for example utilising HIPERLAN, Bluetooth or IEEE 802.11.

The method may include the step of providing at least one of the network elements in the form of a mobile device, for example a personal digital assistant (PDA), a mobile telephone or a laptop computer.

The method may also include the step of providing geographically distributed wireless base stations. This allows mobile devices to remain part of an overall network. The network may be provided in the form of a piconet.

The method may also include the step of providing memory, or a connection or processing power or power source or a cheap connection as the resource to be shared.

According to another aspect of the present invention there is provided a method of improving the performance of a network comprising the steps of:

providing a first network element adapted to broadcast over a network data indicative of its resources;

providing a second network element adapted to select which of the first network element's resources it requires;

requesting said required resources by the second network element; sharing said required resources; and use of said required resources by the second network element in concert with its own resources in the execution of a task.

It will be appreciated that by improving the performance of this network the performance of the network elements will also be improved.

According to a further aspect of the present invention there is provided a network comprising first and second network elements, the first network element having broadcast means adapted to broadcast data indicative of resources of the first network element available for sharing, the second network element having communication means adapted to request at least some of said available resources, the first and second network elements being adapted to execute a task, co-operatively utilising said resources.

The network may be a wireless network and may be a wide band short range wireless network. The network may be a piconet. The network may use HIPERLAN, Bluetooth or IEEE 802.11. Alternatively the network may be a hard-wired LAN or WAN.

The first and second network elements may be any respectively, of a PDA, a PC, a laptop computer, a mobile phone, a router, a server, a regenerative repeater, a multiplexer or a codec.

The resource available for sharing may be memory, central processor time (for example to increase processing power and speed), network connections (for example in order to reduce download/upload times) or a connection to a public land mobile network (for example in order to obtain the cheapest connection).

According to a still further aspect of the present invention there is provided a networked resource sharing protocol including:

a discovery phase;

a negotiation phase; and a fulfilment phase.

The discovery phase may include a first network element broadcasting a notification of its shareable resources over a network.

The negotiation phase may include a second network element requesting at least some of the shareable resources of a first network element. The negotiation phase may include an agreement of a cost for the use of the shareable resources of a first network element by a second network element.

The fulfilment phase may include the co-operative execution of a task by first and second network elements. The fulfilment phase may include the execution of a task by a first network element and the passing of its results to a second network element. The fulfilment phase may include the termination of communication between first and second network elements.

DETAILED DESCRIPTION OF THE DRAWING

Figure 1:
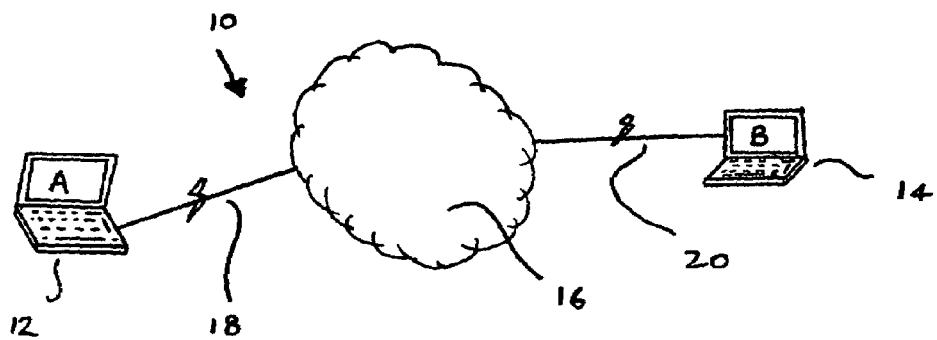
FIG. 1 is a schematic representation of two devices communicating via a network in accordance with the present invention.

FIG. 1 shows a co-operative networking system 10 employing a method of co-operative networking in accordance with the present invention. The networking system 10 comprises first and second computers 12, 14 (labelled respectively as Device A and Device B) and a network 16, for example a wireless network such as a piconet. Each of the computers 12, 14 is linked to the network via respective wide bandwidth short range (WBSR) wireless links 18, 20.

Although shown as computers it will be appreciated that the networked devices could be any suitable network element including PDA, mobile phone, router, server, repeater, multiplexer or codec.

There may be any number of devices joined to the network and the network need not be wireless but could be hardwired. Similarly, a group of devices having wireless communication therebetween may form a piconet using, for example, Bluetooth, IEEE802.11 or HIPERLAN.

Figure 2:
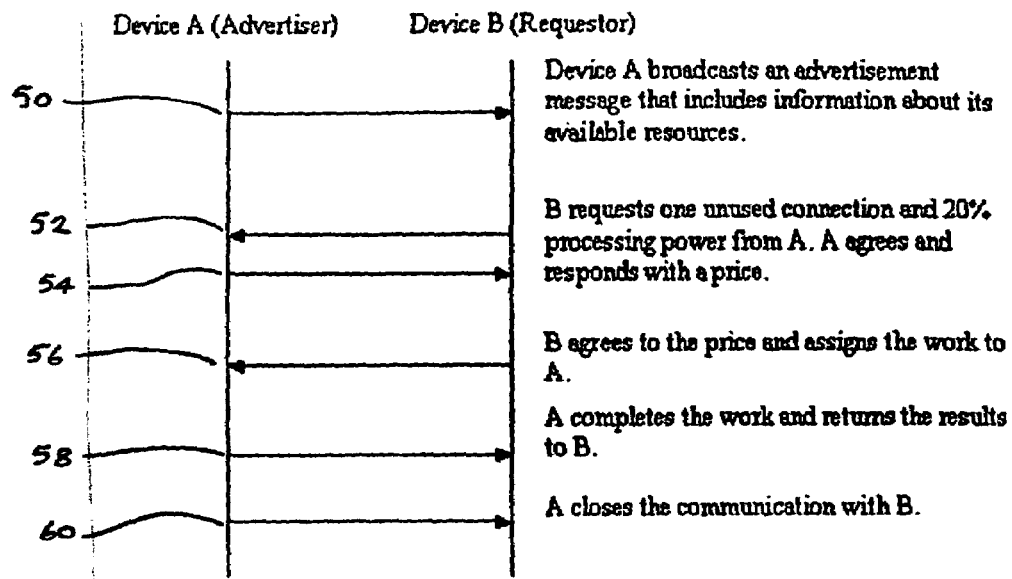
FIG. 2 is a diagram showing interactions of the basic process of the present invention.

FIG. 2 is a simplified diagram for the steps of the resource protocol according to the present invention.

Network Device A broadcasts a message, possibly in the form of a data pocket, which includes information about what resources, (for example memory, processor time and network connections), it has available to share with other networked devices (step 50). If a particular networked device or group of networked devices is/are targeted by Device A to share its resources with the message may not be broadcast but could be unicast or multicast.

Network Device B assesses its own network capabilities and estimates a shortfall from the optimum requirements to execute its current tasks and requests that Device A supplies this shortfall. In the example of FIG. 2 this shortfall is one connection and 20% of the processing power of Device A. If Device A cannot match, or can only partly meet, the needs of Device B, Device B listens for broadcasts from other networked devices and can match resources from a combination of networked devices in order to meet its requirements.

In the example of FIG. 2 Device A can meet the requirements of Device B and evaluates a cost for its shared resources. This costing of Device A's resources is sent to Device B (Step 54). The costing may be in monetary terms, deducted from the user account of Device B or may be in terms of a reciprocal resource sharing arrangement to be executed either concurrently or consecutively with the resource sharing of FIG. 2.

Assuming that Device B agrees to the price set by Device A and communicates this to Device A along with notification that Device A has been assigned the task (Step 56), Device A can execute the task.

The task can be executed by Device A either in concert with Device B, a form of parallel processing, or in isolation from Device B, with the results of Device A's task being passed to Device B (Step 58). As shown in FIG. 2 it is the latter of these two options which occurs in this example.

Device A then closes its communication channel with Device B (Step 60) and is free to re-advertise its available resources over the network for use by any networked device.

A network sharing protocol can be defined by the following division of the timing diagrams of FIG. 2:

Discovery Phase—Step 50

Negotiation Phase—Steps 52, 54, 56

Fulfilment Phase—Steps 58, 60.

Figure 3:
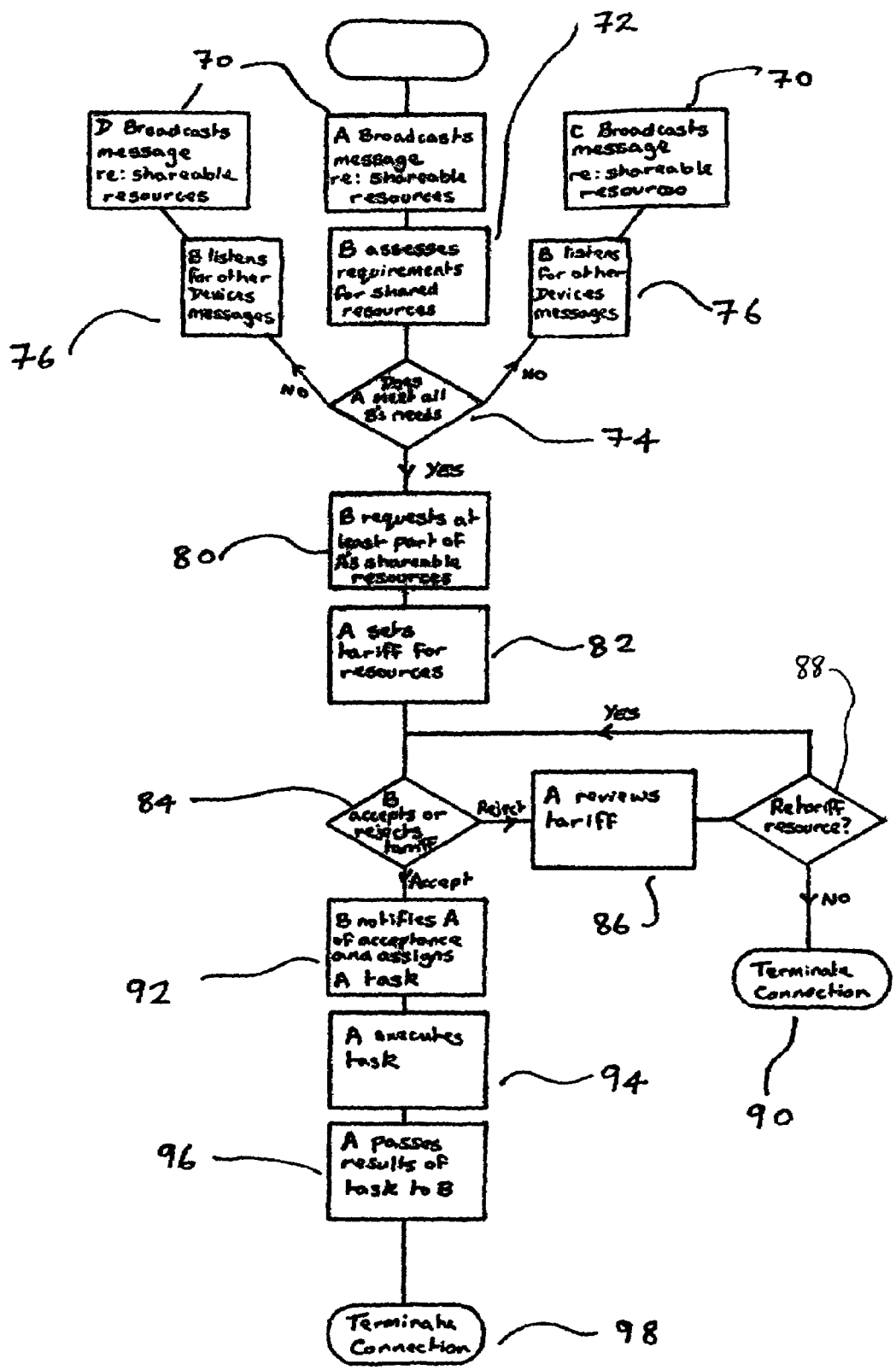
FIG. 3 is a flow chart showing the steps of the method of the present invention.

FIG. 3 is a flow chart of a process according to the present invention.

Device A broadcasts a message containing information regarding its available shareable resources over a network, as do Devices C, D (Step 70). A Device B assesses its needs for shared resources (Step 72) and assesses if Device A's shareable resources meet all of its requirements (Step 74). If not Device B may listen for broadcasts from other Devices and (Step 76) may elect to source all of its resource requirements from another Device or may source partial requirements from a number of Devices.

Device B requests part, or all, of Device A's shareable resources (step 80). Device A sets a tariff for the use of its resources and sends this to Device B (Step 82). Device B either accepts or rejects this tariff (Step 84).

If Device B rejects Device A's proposed tariff for its resources Device A reviews its tariff and decided whether to submit a new resource tariff (Steps 86 and 88). If Device A does not submit a new resource tariff the connection between Devices A and B is terminated (Step 90). Should Device A resubmit a revised tariff for its resources Device B must again decide whether to accept the tariff (Step 84).

Upon deciding to accept Device A's tariff Device B notifies Device A of this (Step 92) and Device A utilises its resources to execute the task it has been appointed by Device B. (Step 94). Device A then passes the results of the task to Device B (Step 96) and the connection between Devices A and B is terminated (Step 98).

A method of sharing resources over a network according to the present invention allows devices to determine each other's capabilities (processing power, connections, memory and storage) and thereby offer new services by optimally using the power available with the network. These new services may include more rapid processing of information by parallel processing, an increase in the nett memory and storage capacity of a device by utilising memory and disk space of other devices and an increased bandwidth by a number of devices collectively downloading data.

An example of an application of such a method of network resource sharing include the collective downloading of a large data file, for example a video clip, by a number of devices. Each device may have only a slow cellular link, typically 9 kbits$^{-1}$ for GSM and 30 kbits$^{-1}$ for GPRS, to the download site. The combined download rate for a number of devices simultaneously downloading only a portion of the file will be considerably higher than a single device attempting to download the whole file.

The combination of the processing power of a number of networked devices in a piconet or other network may allow them to carry out such complex tasks as predict the weather in their locale from information gathered by several spatially separated devices either on the ground or satellites.

A mobile telephone may use the resource sharing method of the present invention with other proximate mobile telephones and communicate call pricing information around the network. This would allow a mobile telephone user to "piggy back" their call onto another mobile telephone with spare call capacity and a cheaper call price and save money for the user.

In the case of piconets and similar wide bandwidth short range wireless networks it is possible that a mobile device, or series of mobile devices, may be used to relay a message beyond the broadcast range of the network transmitters.

A networked device transmits a message to a mobile device, advertising as having spare capacity to carry the message, which passes within the transmission range of the networked device, typically a few tens of meters.

The mobile device then passes out of the transmission range of the networked device. As the mobile device passes other mobile or networked devices it transmits the message to them. This continues until the desired host is reached and is in effect a flooding routing technique. In order to prevent networks becoming jammed with such messages a redundancy factor, for example, either a clock or a network hop counter, must be included so as to erase the message.

Advertisements can be disseminated by the use of the above-mentioned flooding routeing. This would be particularly useful, for example, in shopping malls where there is a high density of people many of whom will have mobile devices such as telephones or PDA's.

A further use of this method is in location awareness within a small-scale piconet. A non-location aware device could ascertain its position from a location aware device, for example one having GPS installed, to an accuracy of a few meters by requesting positional information as a resource.

The method of the present invention would find particular applicability in situations where there would be a low emphasis placed upon the "costing" of the shared resources, for example in a classroom teaching environment where resource cost is generally unimportant compared to the cost of machines themselves.

The invention claimed is:

1. A telecommunication method using a network including at least two network elements; the method comprising the steps of:
    broadcasting data over the network by a first network element;
    including, within the data broadcast by a first of the network elements, the resources of the first network element available for sharing;
    requesting the use of at least part of the available resources of the first network element by a second network element;
    negotiating a cost for the resources by the first and second network elements;
    after the cost has been negotiated, executing a task by co-operation of the first and second network elements by using the requested and negotiated resources of the first network element and resources of the second network element; and
    releasing the resources of the first network element by the second network element after completion of the task.

2. A method according to claim 1, wherein the network is in the form of a wide band short range wireless network.

3. A method according to claim 1, wherein at least one of the network elements in the form of a mobile device.

4. A method according to claim 1, wherein the network includes geographically distributed wireless base stations.

5. A method according to claim 1, wherein the network is a piconet.

6. A method according to claim 1, wherein at least one of the following is the resource to be shared:
    memory;
    a network connection;
    processing power;
    power source; or
    a cheap connection.

7. A network comprising first and second network elements, the first network element having broadcast means adapted to broadcast data indicative of resources of the first network element available for sharing, the second network element having communication means adapted to request at least some of said available resources, the first and second network elements being adapted to execute a task, co-operatively utilizing said resources, and to complete a task at the first network element by using resources at the second network element.

8. A network according to claim 7 wherein the network is a wireless network.

9. A network according to claim 7 wherein network is a wide bandwidth short range wireless network.

10. A network according to claim 7 wherein the first and second network elements includes, respectively, any one of:
    a personal digital assistant;
    a pc;
    a laptop computer;
    a mobile telephone;
    a router;
    a server;
    a regenerative repeater;
    a multiplexer; or
    a codec.

11. A network according to claim 7 wherein the resource for sharing is any one of:
    memory;
    storage capacity;
    network connections; or
    a connection to a public land mobile network.

12. A method of sharing network resources between first and second elements of a network, the method including:
    performing a discovery phase, the discovery phase including a first network element broadcasting a notification of its sharable resources over the network;
    performing a negotiation phase; and
    performing a fulfillment phase,
    the negotiation phase including an agreement of a cost for the use of shareable resources of the first network element by the second network element during the fulfillment phase, and
    the fulfillment phase including co-operation between the first and second network elements of the sharable resources of the first element in accordance with the agreement made during the negotiation phase.

13. A method according to claim 12, wherein the negotiation phase includes the second network element requesting at least some sharable resources of the first network element.

14. A method according to claim 12 wherein the fulfillment phase includes execution of a task by the first network element and passing of a result of the task to the second network element.

15. A method according to claim 12 wherein the fulfillment phase includes termination of communication between the first and second network elements.

16. A first network element for use in a telecommunication network including the first network element and a second network element arranged for (a) issuing requests to the first network element and (b) sending the requests to the first network element via the telecommunication network, the first network element comprising:
   a transmitter receiver for broadcasting and receiving data over the network; and
   a processor arrangement connected to interact with the transmitter/receiver for (a) indicating, within the data, resources of the first network element available for sharing, (b) receiving a request by the second network element for use of at least part of the available resources of the first network element by the second network element, the use being to assist in performing a task of the second network element, (c) enabling the first network element to cooperate with the second network element to negotiate a cost for the resource, (d) using the resources in cooperation with resources of the second network element to assist in performing the task, the processor being arranged to use the resources after completion of the negotiation, and (e) releasing the resources of the first network element after completion of the task in response to a request by the second network element.

17. The network element of claim 16 wherein the network is a piconet and the transmitter/receiver is adapted for use with the piconet.

18. A method of operating a first network element of a telecommunication network including the first network element and a second network element arranged for (a) issuing request to the first network element and (b) sending the requests to the first network element via the telecommunication network, the operating method of the first network element comprising:
   broadcasting data over the network;
   including, within the data broadcast by the first network element, the resources of the first network element available for sharing;
   receiving a request, via the network, by the second network element, the use being to assist in performing a task of the second network element, for use of at least part of the available resources of the first network element by the second network element;
   negotiating a cost for the resources by cooperating with the second network element;
   using the resources in cooperation with resources of the second network element to assist in performing the task, the processor being arranged to use the resources after completion of the negotiation, and
   releasing the resources of the first network element after completion of the task in response to a request received by the first network element, via the network, as transmitted by the second network element.

19. The method of claim 18 wherein the network is a piconet and the data are transmitted from the first network element and the request is received by the first network element by a transmitter/receiver arrangement adapted for use with the piconet.

20. A second network element for use in a telecommunication network including a first network element and the second network element, the first network element being arranged for (a) broadcasting data over the network, (b) indicating, within the data, resources of the first network element available for sharing, (c) releasing the resources of the first network element upon completion of the task in response to a request by the second network element, the second network element comprising:
   a transmitter/receiver for broadcasting and receiving data over the network; and
   a processor arrangement connected to interact with the transmitter/receiver for (a) causing transmission via the network to the first network element of a request for the use of at least part of the available resources of the first network element, (b) causing the second network element to cooperate with the first network element to negotiate a cost for the available resources, (c) causing co-operation of a resource of the second network element with the available resources of the first network element, the co-operation causing the performance of a task of the second network element, the co-operation occurring after the completion of the negotiation, and (d) causing transmission via the network to the first network element for release of the available resources of the first network element after completion of the task.

21. The network element of claim 20 wherein the network is a piconet and the data are transmitted from the first network element and received by the first network element by a transmitter/receiver arrangement adapted for use with the piconet.

22. A method of operating a second network element of a telecommunication network including a first network element and the second network element, the first network element being arranged for (a) broadcasting data over the network, (b) indicating, within the data, resources of the first network element available for sharing, and (c) releasing the resources of the first network element upon completion of the task in response to a request by the second network element, the method of operating the second network element comprising:
   sending, via the network, to the first network element a request for use of at least part of the available resources of the first network element;
   negotiating a cost for the resources by cooperating with the first network element;
   causing co-operation of a resource of the second network element with the available resources of the first network element, the co-operation causing the performance of a task of the second network element, the co-operation occurring after the completion of the negotiation; and
   sending, via the network, to the first network element a release of the resources of the first network element after completion of the task.

23. The method of claim 22 wherein the network is a piconet and the request and release are sent from the second network element by a transmitter/receiver arrangement adapted for use with the piconet and the co-operation by the second network element is achieved by the transmitter/receiver arrangement adapted for use with the piconet.

24. A telecommunication method using a network including at least two network elements; the method comprising the steps of:
  broadcasting data over the network by a first network element;
  including, within the data broadcast by the first network element, the resources of the first network element available for sharing;
  requesting the use of at least part of the available resources of the first network element by a second network element;
  executing a task by co-operation of the first and second network elements;
  releasing the resources of the first network element by the second network element upon completion of the task; and
  completing the task at the first network element by using resources at the second network element.

25. A method according to claim 24, wherein the networks is a wide band short range wireless network.

26. A method according to claim 24, wherein at least one of the network elements is a mobile device.

27. A method according to claim 24, wherein the network includes geographically distributed wireless base stations.

28. A method according to claim 24, wherein at least one of the following is the resource to be shared:
  memory;
  a network connection;
  processing power;
  power source; or
  a cheap connection.

29. The method of claim 24 wherein the network is a piconet and the data are transmitted from the first network element by a first transmitter/receiver arrangement of the first network element adapted for use with the piconet, and the request and release are transmitted from the second network element by a second transmitter/receiver arrangement of the second network element adapted for use with the piconet, the first and second transmitter/receiver arrangements exchanging signals causing the task to be executed by co-operation of the first and second network elements.

30. A first network element for use in a telecommunication network including the first network element and a second network element arranged for (a) issuing requests to the first network element and (b) sending the requests to the first network element via the telecommunication network, the first network element comprising:
  a transmitter/receiver for broadcasting and receiving data over the network; and
  a processor arrangement connected to interact with the transmitter/receiver for (a) indicating, within the data broadcast by the transmitter/receiver, resources of the first network element available for sharing, (b) receiving a request by the second network element for use of at least part of the available resources of the first network element by the second network element, (c) causing the first network element to cooperate with the second network element to execute a task, (d) releasing the resources of the first network element upon completion of the task in response to a request by the second network element, and (e) completing the task at the first network element by using resources at the second network element.

31. The network element of claim 30 wherein the network is a piconet and the transmitter/receiver is adapted for use with the piconet.

32. A method of operating a first network element of a telecommunication network including the first network element and a second network element arranged for (a) issuing requests to the first network element and (b) sending the requests to the first network element via the telecommunication network, the operating method of the first network element comprising:
  broadcasting data over the network;
  including, within the data broadcast by the first network element, the resources of the first network element available for sharing;
  receiving a request, via the network, by the second network element for use of at least part of the available resources of the first network element by the second network element;
  executing a task by cooperating with the second network element;
  releasing the resources of the first network element after completion of the task in response to a request received by the first network element, via the network, as transmitted by the second network element; and
  completing the task at the first network element by using resources at the second network element.

33. The method of claim 32 wherein the network is a piconet and the data are transmitted from the first network element and the request is received at the first network element by a transmitter/receiver arrangement adapted for use with the piconet.

34. A second network element for use in a telecommunication network including a first network element and the second network element, the first network element being arranged for (a) broadcasting data over the network, (b) indicating, within the data broadcast by the first network element, resources of the first network element available for sharing, (c) releasing the resources of the first network element upon completion of the task in response to a request by the second network element, the second network element comprising:
  a transmitter/receiver for broadcasting and receiving data over the network; and
  a processor arrangement connected to interact with the transmitter/receiver for (a) causing transmission via the network to the first network element of a request for the use of at least part of the available resources of the first network element, (b) causing the second network element to cooperate with the first network element to execute a task, (c) causing transmission via the network to the first network element for release of the resources of the first network element after completion of the task, and (d) causing resources at the second network element to be used for completing the task at the first network element.

35. The network element of claim 34 wherein the network is a piconet and the transmitter/receiver is adapted for use with the piconet.

36. A method of operating a second network element of a telecommunication network including the first network element and the second network element, the first net element being arranged for (a) broadcasting data over the network, (b) indicating, within the data resources of the first network element available for sharing, (c) co-operating with the second network element to complete a task of the second network element, and (d) releasing the resources of the first network element upon completion of the task in response to a request by the second network element, the method of operating the second network element comprising:
  sending, via the network, to the first network element a request for the use of at least part of the available resources of the first network element;

cooperating with the first network element so the task is completed at the first network element by using resources at the second network element; and sending, via the network, to the first network element a release of the resources of the first network element after completion of the task.

37. The method of claim 36 wherein the network is a piconet and the request and release are sent from the second network element by a transmitter receiver arrangement adapted for use with the piconet and the task is completed at the first network element as a result of cooperation between the first and second network elements via signals coupled through the transmitter/receiver arrangement adapted for use with the piconet.

38. A network comprising at least first and second network nodes, the first network node including a first transmitter/receiver arrangement for (a) broadcasting to other network nodes of the network data indicative of resources of the first network node available for sharing to assist in performing tasks of the other network nodes, and (b) receiving signals from the other network nodes, the second network node having a second transmitter/receiver arrangement for (a) broadcasting to further network nodes of the network a request for shared resources available from the further network nodes to assist in performing a task of the second network node and (b) receiving from the first network node the broadcast data indicative of the first network node available for sharing the first and second network nodes being arranged for causing the first and second transmitter/receiver arrangements to exchange signals (a) concerned with negotiating a cost to the second network node of resources of the first network node available for sharing to assist in performing the task of the second network node and (b) for thereafter enabling the resources of the first network node available for sharing to be used cooperatively with resources of the second network node to assist in performing the task of the second network node.

39. The network of claim 38 wherein the network is a piconet and the first and second transmitter/receiver arrangements are adapted for use with the piconet.

40. A network comprising at least first and second network nodes, the first network node including a first transmitter/receiver arrangement for (a) broadcasting to other network nodes of the network data indicative of resources of the first network node available for sharing to assist in performing tasks of the other network nodes, and (b) receiving signals from the other network nodes, the second network node having a second transmitter/receiver arrangement for (a) broadcasting to further network nodes of the network a request for shared resources available from the further network nodes to assist in performing a task of the second network node and (b) receiving from the first network node the broadcast data indicative of the first network node available for sharing the first and second network nodes being arranged for causing the first and second transmitter/receiver arrangements to exchange signals for enabling the resources of the first network node available for sharing to be used cooperatively with resources of the second network node such that the first network node completes the task of the second network node.

41. The network of claim 40 wherein the network is a piconet and the first and second transmitter/receiver arrangements are adapted for use with the piconet.

* * * * *